(12) United States Patent
Haider et al.

(10) Patent No.: US 9,895,844 B2
(45) Date of Patent: *Feb. 20, 2018

(54) SYSTEM FOR USE WITH THREE-DIMENSIONAL PRINTER AND METHOD FOR USING THE SAME

(71) Applicant: MakerBot Industries, LLC, Brooklyn, NY (US)

(72) Inventors: Charles John Haider, St. Paul, MN (US); Michael Joseph Kobida, Lake Barrington, IL (US); Cedric James Kovacs-Johnson, Wilmette, IL (US); Taylor Michael Fahey, Belle Plaine, MN (US); Tim Andreas Osswald, Madison, WI (US)

(73) Assignee: MakerBot Industries, LLC, Brooklyn, NY (US)

(*) Notice: Subject to any disclaimer, the term of this patent is extended or adjusted under 35 U.S.C. 154(b) by 368 days.

This patent is subject to a terminal disclaimer.

(21) Appl. No.: 14/589,841

(22) Filed: Jan. 5, 2015

(65) Prior Publication Data

US 2015/0231829 A1    Aug. 20, 2015

Related U.S. Application Data

(60) Provisional application No. 62/051,944, filed on Sep. 17, 2014, provisional application No. 61/941,899, filed on Feb. 19, 2014.

(51) Int. Cl.
*G06F 19/00* (2011.01)
*B29C 67/00* (2017.01)
(Continued)

(52) U.S. Cl.
CPC ........ *B29C 67/0088* (2013.01); *B29C 64/118* (2017.08); *B29C 64/321* (2017.08);
(Continued)

(58) Field of Classification Search
None
See application file for complete search history.

(56) References Cited

U.S. PATENT DOCUMENTS 5,888,651 A * 3/1999 Hoyt .................. D01D 5/253
428/370
5,936,861 A    8/1999 Jang et al.
(Continued)

FOREIGN PATENT DOCUMENTS

WO    WO-2012152511    11/2012
WO    WO-2015126733    8/2015

OTHER PUBLICATIONS

International Search Report for Application No. PCT/2015/015708 dated May 15, 2015 (5 pages).
(Continued)

*Primary Examiner* — Philip Wang
(74) *Attorney, Agent, or Firm* — Strategic Patents, P.C.

(57) ABSTRACT

An assembly that is configured to be coupled to and communicate with a 3D printer having a printer head includes a color-application unit positioned upstream of the 3D printer. The color-application unit is configured to receive a filament and direct the filament to the printer head of the 3D printer. The assembly also includes a color applicator coupled to the color-application unit. The color applicator is operable to selectively apply color to an interior surface of the filament.

17 Claims, 15 Drawing Sheets

(51) Int. Cl.
  *G05B 15/02*    (2006.01)
  *B33Y 30/00*    (2015.01)
  *B33Y 40/00*    (2015.01)
  *B29C 64/386*   (2017.01)
  *B29C 64/321*   (2017.01)
  *B29C 64/118*   (2017.01)
  *B33Y 50/02*    (2015.01)

(52) U.S. Cl.
  CPC ............ *B29C 64/386* (2017.08); *B33Y 30/00* (2014.12); *B33Y 40/00* (2014.12); *G05B 15/02* (2013.01); *B33Y 50/02* (2014.12)

(56) References Cited

U.S. PATENT DOCUMENTS

| | | |
|---|---|---|
| 6,280,785 B1 | 8/2001 | Yang et al. |
| 6,730,399 B2 | 5/2004 | Baughman et al. |
| 6,756,120 B2 | 6/2004 | Baughman et al. |
| 6,893,489 B2 | 5/2005 | Lem et al. |
| 6,982,117 B2 | 1/2006 | Baughman et al. |
| 7,991,498 B2 | 8/2011 | Kritchman et al. |
| 8,439,665 B2 | 5/2013 | Batchelder et al. |
| 8,920,697 B2 | 12/2014 | Deckard et al. |
| 2003/0044593 A1 | 3/2003 | Vaidyanathan et al. |
| 2007/0228590 A1 | 10/2007 | Labossiere et al. |
| 2010/0327479 A1 | 12/2010 | Zinniel et al. |
| 2013/0224423 A1* | 8/2013 | Mikulak ............... B29C 47/025 428/68 |
| 2013/0292881 A1 | 11/2013 | Steiner et al. |
| 2013/0328228 A1* | 12/2013 | Pettis ................. F16M 13/022 264/40.1 |
| 2014/0000747 A1* | 1/2014 | Lasarov .................. B05D 7/22 138/108 |
| 2014/0034214 A1 | 2/2014 | Boyer et al. |
| 2014/0070461 A1 | 3/2014 | Pax |
| 2014/0134334 A1* | 5/2014 | Pridoehl ................ B05D 1/265 427/256 |
| 2014/0265035 A1 | 9/2014 | Buser et al. |
| 2015/0091208 A1 | 4/2015 | Sadusk et al. |
| 2015/0093465 A1* | 4/2015 | Page ................. B29C 67/0088 425/132 |
| 2015/0093588 A1 | 4/2015 | Sadusk et al. |
| 2015/0352789 A1 | 12/2015 | Haider et al. |
| 2016/0101567 A1* | 4/2016 | John Van Liew .. B29C 67/0085 264/245 |

OTHER PUBLICATIONS

International Written Opinion for Application No. PCT/2015/015708 dated May 15, 2015 (7 pages).
USPTO "U.S. Appl. No. 14/829,023, Non-Final Office Action dated Jun. 1, 2017", 16 pages.
WIPO "PCT Application No. PCT/US15/015708 International Preliminary Report on Patentability dated Sep. 1, 2016", 9 pages.
EPO, "EP Application Serial No. 15751830.9, Search Report dated Sep. 21, 2017", 7 pages.
USPTO, "U.S. Appl. No. 14/829,023 Notice of Allowance dated Oct. 16, 2017", 13 pages.

* cited by examiner

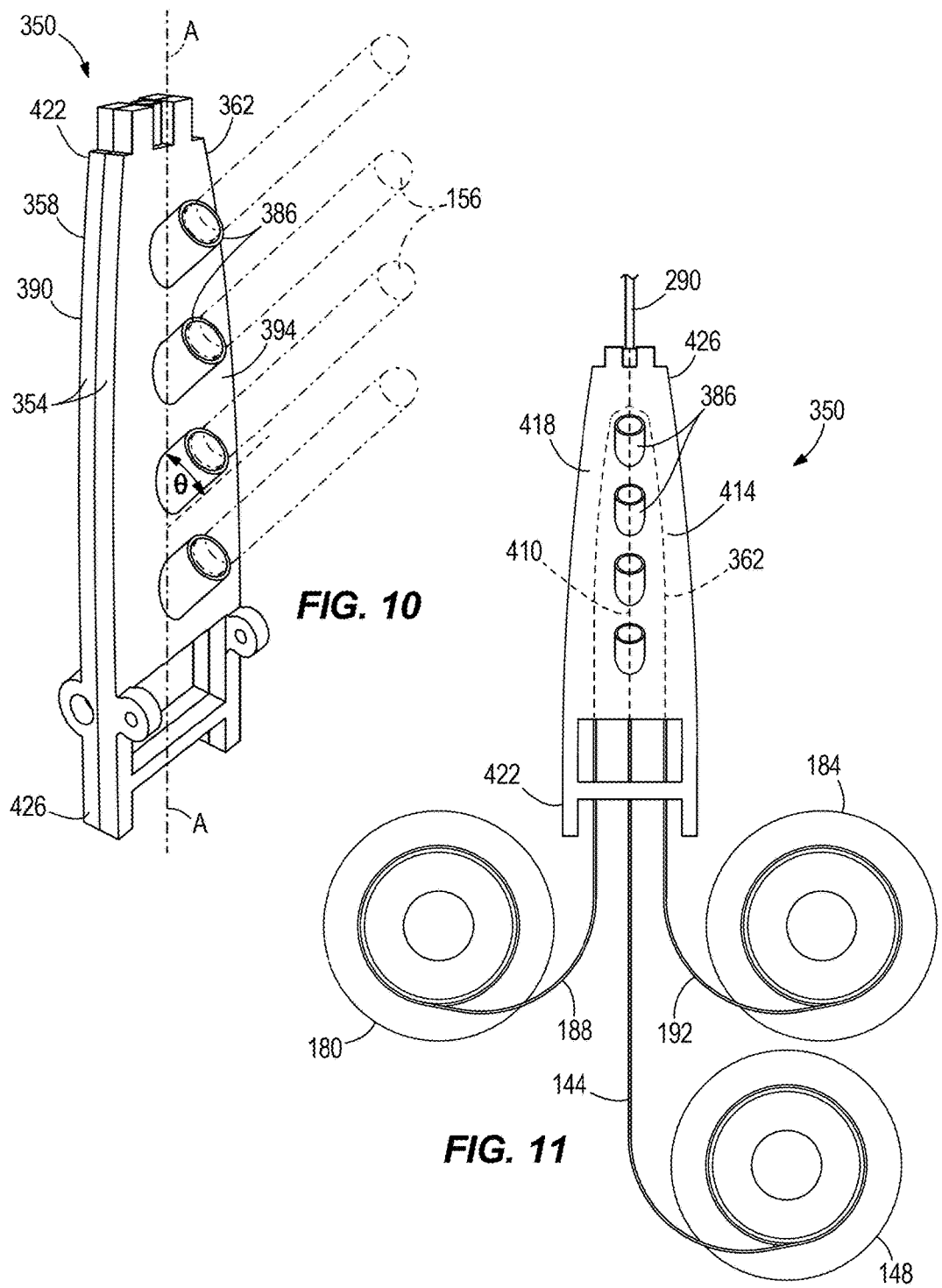

SYSTEM FOR USE WITH THREE-DIMENSIONAL PRINTER AND METHOD FOR USING THE SAME

CROSS-REFERENCE TO RELATED APPLICATIONS

The present application claims priority to U.S. Provisional Patent Application No. 61/941,899, filed Feb. 19, 2014, and to U.S. Provisional Patent Application No. 62/051,944, filed Sep. 17, 2014, the entire contents of both of which are incorporated by reference herein.

BACKGROUND

The present application relates to a coloring system for use with a three-dimensional (3D) printer. The application also relates to a method for producing 3D, colored objects.

Three-dimensional (3D) printing refers to the process of creating a 3D object through an additive process, where successive layers of material are laid down under the control of a computer. Conventionally, a three-dimensional printer can use an extrusion 3D printing process, which refers to a Fused Deposition Modeling (FDM) process or a similar process where a build material is heated and then deposited layer by layer onto a build platform. By adding many thin layers on top of one another, sometimes hundreds or thousands, a 3D object is created.

Typically, 3D printers include at least one printer head, or extruder, containing a nozzle from which the melted build material is extruded onto the build platform to create 3D objects. The build material generally originates from an upstream feed of a raw polymer in the form of a filament. This filament is fed into the upper region of the extruder as a solid, where it is then melted and deposited in its molten form from the extruder nozzle in a continuous stream.

SUMMARY

In one embodiment, the disclosure provides an assembly that is configured to be coupled to and communicate with a 3D printer having a printer head. The assembly includes a color-application unit that is positioned upstream of the 3D printer. The color-application unit is configured to receive a filament and direct the filament to the printer head of the 3D printer. The assembly also includes a color applicator coupled to the color-application unit. The color applicator is operable to selectively apply color to an interior surface of the filament.

In another embodiment, the disclosure provides a method for preparing a filament for use with a printer head of a 3D printer. The method includes receiving the filament at a color-application unit positioned upstream of the 3D printer. The method also includes applying color, by a color applicator coupled to the color-application unit, to an interior surface of the filament. The method further includes directing the filament from the color-application unit to the printer head of the 3D printer.

In another embodiment, the disclosure provides a filament for use with a printer head of a 3D printer. The filament includes an exterior surface and an interior surface having color selectively applied thereto. The color of the interior surface is visible through the exterior surface.

Other aspects of the disclosure will become apparent by consideration of the detailed description and accompanying drawings.

BRIEF DESCRIPTION OF THE DRAWINGS

FIG. 10 is a perspective view of another color-application unit for use with a 3D printer.

FIG. 11 is a side view of the color-application unit of FIG. 10.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
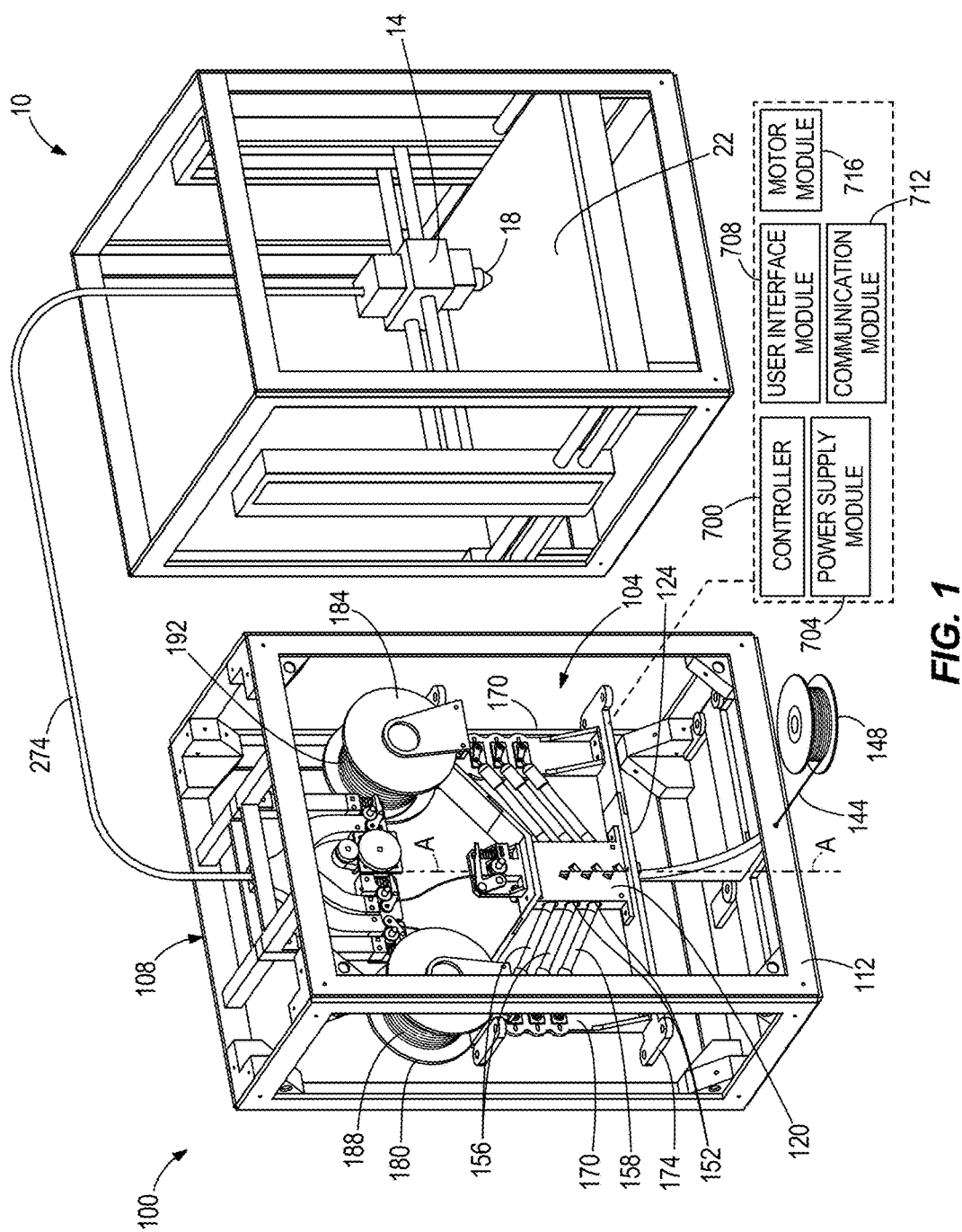
FIG. 1 is a perspective view of a system including a 3D printer and an assembly coupled to the 3D printer, the assembly including a color-application unit, a color applicator, and a coupler.
Figure 3:
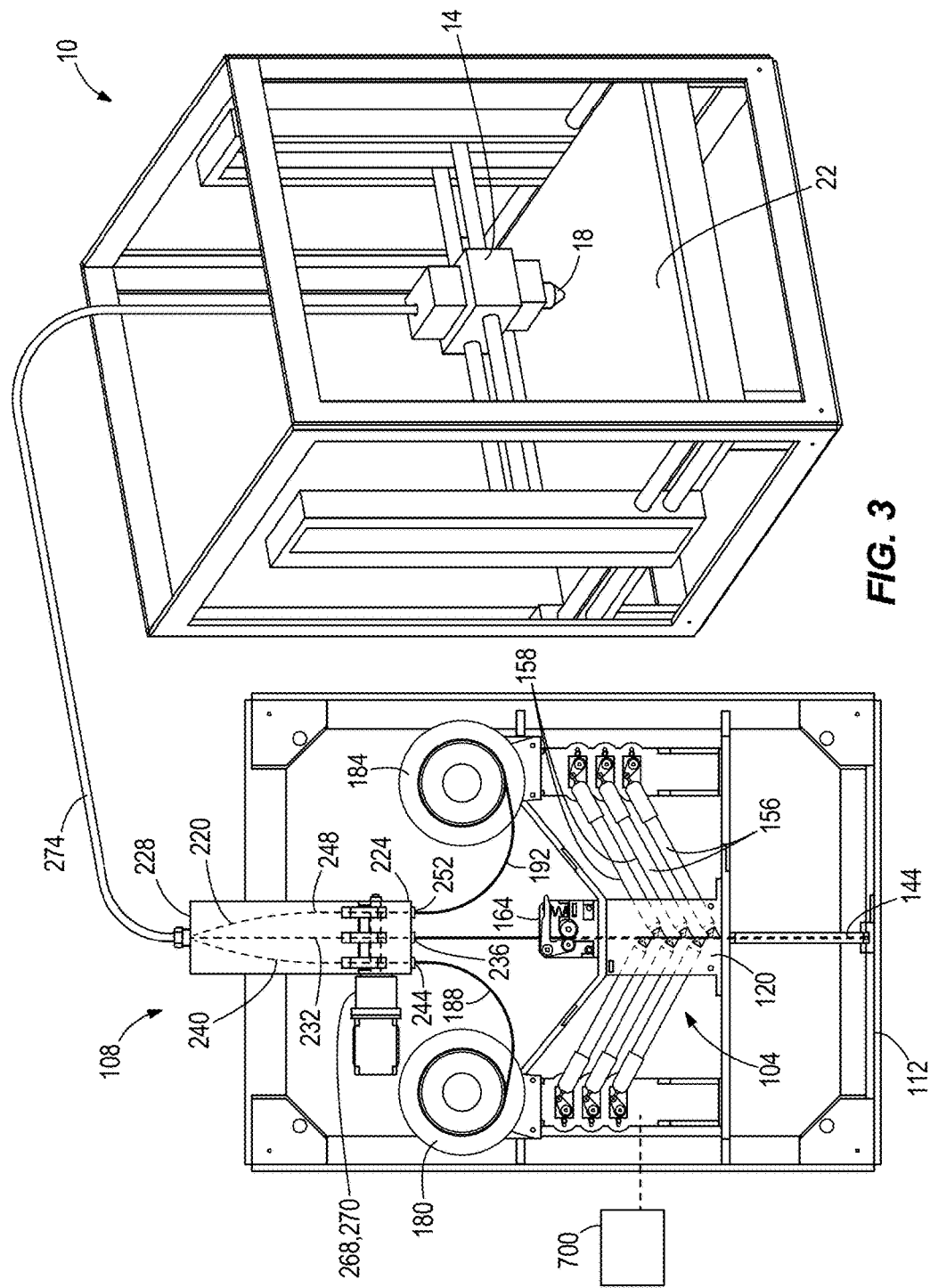
FIG. 3 is a perspective view of a system including the 3D printer and an assembly having a coupler according to another embodiment of the invention.
Figure 15:
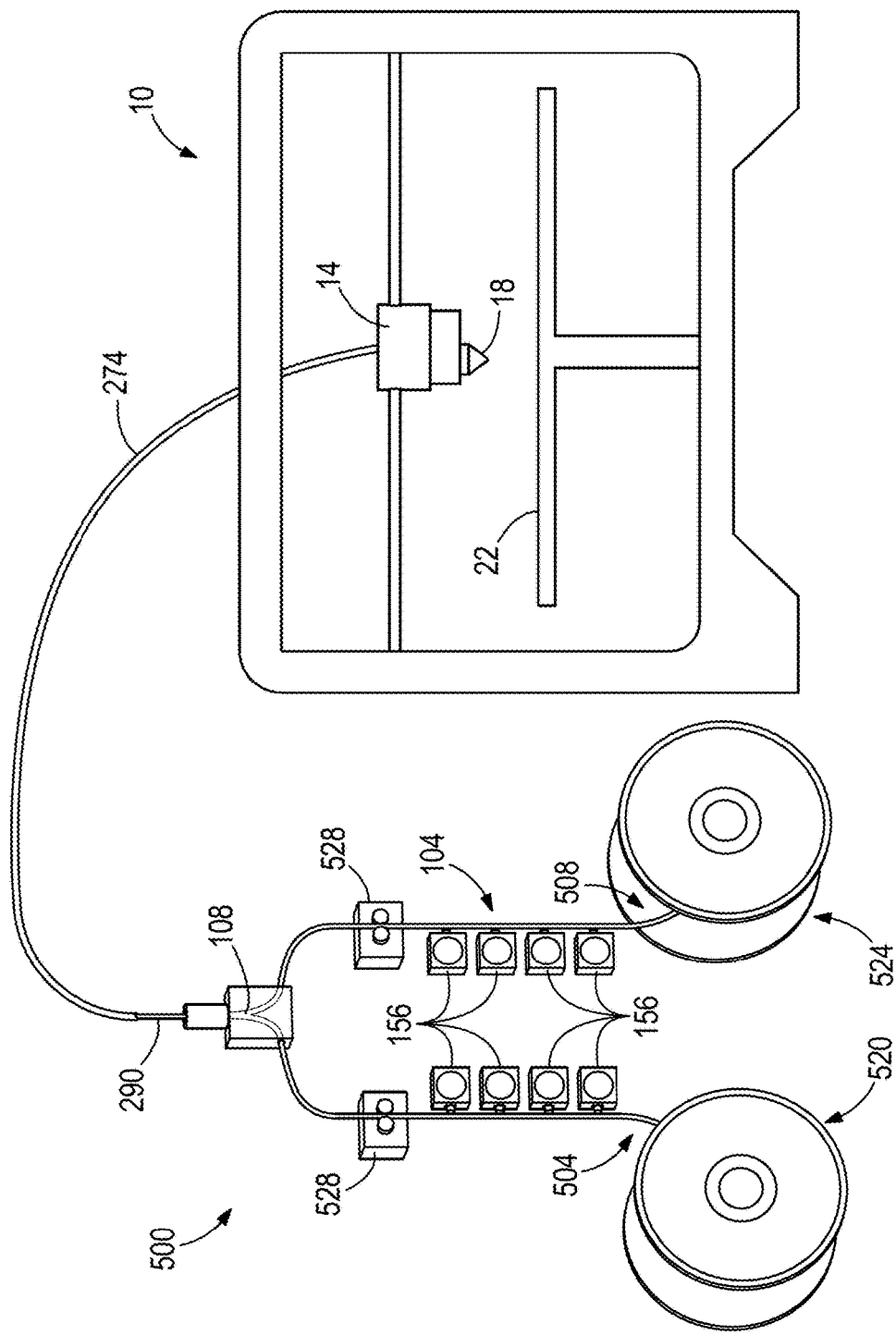
FIG. 15 is a schematic of a system including the 3D printer and an assembly according to another embodiment.

FIGS. 1, 3, and 15 illustrate a 3D printer 10 including a printer head or extruder 14 that has a nozzle 18 and is slidably positioned above a platform 22. The nozzle 18 (FIGS. 5 and 6) includes walls 24 that define a channel 26 extending therethrough. The channel 26 has an inlet 30 and an outlet 34. The channel 26 also has a diameter D that decreases from the inlet 30 to the outlet 34.

Figure 2:
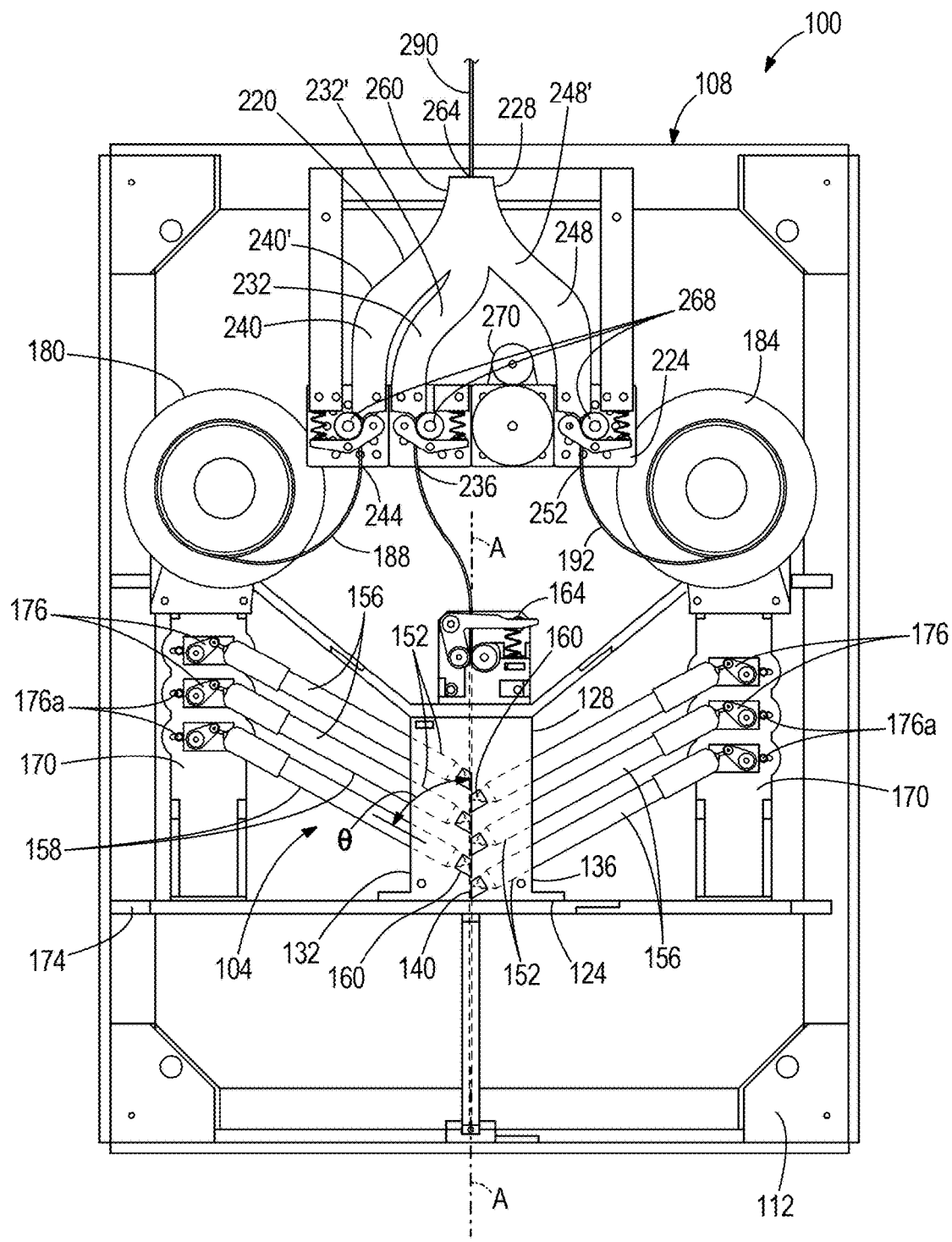
FIG. 2 is a plan view of the color-application unit, color applicator, and coupler shown in FIG. 1.

FIGS. 1-3 illustrate a color-application and feed assembly 100 that is configured to be coupled to and communicate with the 3D printer 10. The illustrated assembly 100 includes a color-application unit 104 and color applicators 156. In the illustrated embodiment, the assembly 100 includes six color applicators 156, but may alternatively include fewer or more color applicators 156. Each color applicator 156 is coupled to (e.g., supported by) the color-application unit 104 to apply color to a surface of a filament (e.g., first filament portion 144 discussed below). The assembly 100 also includes a coupler or annealing unit 108 positioned between the color-application unit 104 and the 3D printer 10. In the illustrated embodiment, the color-application unit 104 and the coupler 108 are coupled to and positioned within a support structure or frame 112.

In the embodiments illustrated in FIGS. 1-3, the color-application unit 104 includes a body 120 that defines a longitudinal axis A. The body 120 includes first end 124, a second end 128, a first side 132, and a second side 136. In the illustrated embodiment, the body 120 is formed as a single piece, but in other embodiments, the body 120 may be formed of separate pieces that are coupled to one another. The body 120 further includes a first channel or conduit 140 that extends from the first end 124 to the second end 128. The conduit 140 is sized and shaped to receive a first filament, or strand, portion 144 from a first spool 148 positioned adjacent the first end 124 of the body 120. The first filament portion 144 may be any suitable material having any suitable size or shape, as discussed in greater detail below. In the illustrated embodiment, the first filament portion 144 is substantially cylindrical or rod-shaped and may have a diameter in the range of 0.5-3.0 mm, with a preferable diameter of about 1.75 mm.

The body 120 also defines through-holes or apertures 152 extending from each of the first side 132 and the second side 136 towards the conduit 140. Each of the through-holes 152 is configured to movably (e.g., slideably) receive one of the color applicators 156. In the embodiment illustrated in FIGS. 1-3 and 7-9, the color applicator 156 is an elongate member 158 that has a color applicator tip 158a. The elongate member 158 contains a color material and dispenses the color material through the tip 158a. For example, the elongate member 158 may be a felt-tip marker or pen. Other embodiments utilize although other types of color applicators 156, which will discussed in greater detail below. Also, in the embodiments illustrated in FIGS. 1-3, the through-holes 152 are oriented at an angle θ relative to the longitudinal axis A (FIG. 2) of the body 120. In some embodiments, the angle θ can range from about 20 degrees to about 70 degrees. In the illustrated embodiment, the angle θ is about 30 degrees. In further embodiment, the angle θ may be larger or smaller than that illustrated herein. In the illustrated embodiment, the body 120 also includes apertures 160 that are oriented generally perpendicular to the longitudinal axis A. Each of the apertures 160 corresponds to one of the through-holes. The apertures 160 enable the color applicators 156, and more particularly the tips 158a, to communicate with the filament portion 144 in the conduit 140 to selectively apply color to the filament portion 144. The apertures 160 give the user the ability to see the color applicators 156, and more particularly the tips 158a, during a visual calibration process.

As shown in FIG. 2, the color-application unit 104 also includes a motor assembly 164. The illustrated motor assembly 164 includes a motor and a roller that engages the filament portion 144. The motor drives (e.g., rotates) the roller to move the filament portion 144 through the conduit 140 of the body 120. In the illustrated embodiment, the motor assembly 164 is positioned above the body 120 to pull the filament portion through the conduit 140. In other embodiments, the motor assembly 164 may be positioned elsewhere relative to the body 120 to push or pull the filament portion 144 through the conduit 140.

Further with respect to FIGS. 1-3, the support structure 112 has two members 170 that are coupled to a support surface 174 on either side of color-application unit 104. The color applicators 156 are coupled to the members 170 by actuators 176 (FIG. 2). In the illustrated embodiment, the color applicators 156 are biased (e.g., by a spring, a cam, a lever, or the like) to a first position such that the color applicator tips 158a are spaced apart from the conduit 14. Each of the actuators 176 is selectively actuatable by (e.g., rotatable, slidable, or otherwise moveable) by a motor 176a. Actuating the actuators 176 moves the color applicators 156 toward the conduit 140 to apply color to the filament portion 144 within the conduit 140.

Figure 19A:
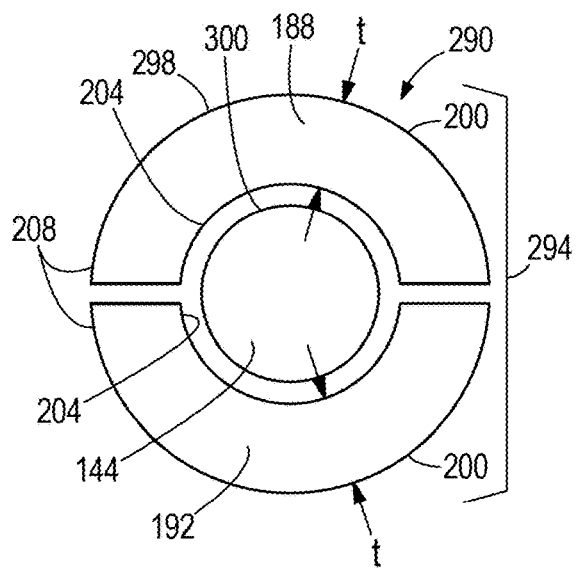

The illustrated support members 170 also support a second spool 180 and a third spool 184, which include second and third filament, or strand, portions 188, 192, respectively. The second and third filament portions 188, 192 may be any suitable material having any suitable size or shape. With reference to FIG. 19a, in the illustrated embodiment, each of the second and the third filament portions 188, 192 include a substantially C-shaped body 200 having a substantially arcuate groove 204. Accordingly, the second and the third filament portions 188, 192 each define a wall 208 having a thickness t in the range of approximately 0.01-1.5 mm, with preferably thickness of 0.5 mm. The second and the third filament portions 188, 192 are substantially clear or transparent (e.g., colorless).

Referring back to FIGS. 1-3, the coupler 108 is spaced apart from the color-application unit 104 and the spools 148, 180, 184. The illustrated coupler 108 is positioned downstream of the color-application unit 104 and upstream of the 3D printer 10. In the illustrated embodiment, the coupler 108 is suspended above the color-application unit 104. In other embodiments, the coupler 108 may be positioned elsewhere. With respect to FIG. 2, the coupler 108 includes a body 220 having a first end 224 and a second end 228. The body 220 includes a first channel 232 having a first inlet 236, a second channel 240 having a second inlet 244, and a third channel 248 having a third inlet 252. The inlets 236, 244, 252 are positioned at the first end 224 of the body 220. The first, the second, and the third channels 232, 240, 248 extend through the body 220 and converge into a single discharge channel 260 having an outlet 264 at the second end 228 of the body 220. A roller assembly 268 that is actuated by a second motor 270 is positioned adjacent the first end 224 of the coupler 108. A conduit 274 (FIG. 1) extends between the coupler 108 and the printer head 14. In the embodiment illustrated in FIGS. 1-2, the coupler 108 includes first, second, and third portions 232', 240', 248' that are spaced apart from one another through which the first, the second, and the third channels 232, 240, 248 extend, respectively. The first, second, and third portions 232', 240', 248' are coupled to one another to define the discharge channel 260. In the embodiment of FIG. 3, however, the first, second, and third channels 232, 240, 248 are contained within and extend along a substantially rectangular body 220. The first, the second, and the third channels 232, 240, 248 converge within the body 220 adjacent to the second end 228 of the coupler 108 prior to being guided through the conduit 274, as noted above.

In operation and with reference to FIGS. 1-4, the first filament portion 144 is advanced by the first motor 164 from the first spool 148 and moves through the conduit 140 in the body 120 of the color-application unit 104. As the first filament portion 144 advances through the body 120, the color applicators 156 are selectively actuated (e.g., by selectively energizing the motors of the actuators 176) to apply color to a portion of the first filament portion 144. For example, the motor 176a actuates the actuators 176 to slide or move the respective the color applicator 156 towards the conduit 140 and into a second position in which the color applicator tip 158a contacts the first filament portion 144.

When the tip 158a engages the first filament portion 144, the applicator 156 applies color to filament portion 144. As used herein, "color" refers to a material or substance (e.g., ink, coating, etc.) that is applied to the filament portion 144 to change or enhance (e.g., brighten or strengthen) the color of the filament portion 144. The color may be any color or mixture of colors, including white.

After a color is applied, the first filament portion 144 is then guided to the first inlet 236 in the coupler 108. At the same time, the second and third filament portions 188, 192 are guided to the second and third inlets 244, 252 of the coupler 108, respectively. Preferably, the second and third filament portions 188, 192 are guided through the coupler 108 such that the grooves 204 (FIG. 19a) face one another. Accordingly, the first, second, and third filament portions 144, 188, 192 are guided through the respective channels 232, 240, 248 from the first end 224 of the coupler 108 to the second end 228. In other words, the motor 270 actuates the roller assembly 268 to advance each of the first, second, and third filament portions 144, 188, 192 through the second, first, and third channels 232, 240, 248, respectively, of the coupler 108. Where the first, second, and third channels 232, 240, 248 converge, the grooves 204 of the second and the third filament portions 188, 192 receive the first filament portion 144 therebetween. Once the first filament portion 144 is positioned between the second and third filament portions 188, 192, the second and third filament portions 188, 192 are pressed together or otherwise mechanically coupled to create a filament 290. The second and third filament portions 188, 192 thereby substantially enclose the first filament portion 144 to create the filament 290. The filament 290, when coupled together, defines a cylindrical shape having a diameter in the range of 1.0 mm to 5.0 mm such that the filament 290 may be used with a suitable 3D printer (e.g., the printer 10 (FIGS. 1 and 3)).

The filament 290 defines a filament profile 294 that includes the first, colored filament portion 144 surrounded or encompassed by the second and the third filament portions 188, 192. As such, the filament 290 includes an exterior surface 298 and an interior surface 300. In the embodiment of the assembly 100 discussed above, the exterior surface 298 is defined by the second and third filament portions 188, 192, and the interior surface includes the first filament portion 144. In the embodiment of FIGS. 1-3 and 19a, the color applied to the filament 290 is applied to surface 300 and covered by surfaces 204 of filament portions 188 and 192. The filament portions 188, 192 are transparent so the color material is visible from the outside of the filament 298.

After the filament 290 is formed, the filament 290 moves from the coupler 108 to the printer head 14 through the conduit 274. The printer head 14 is configured to heat and melt the materials of the filament 290 such that the melted material can move through and be deposited by the nozzle 18 onto the platform 22. In particular, the filament 290 is fed into an upper region of the printer head 14 as a solid, where it is then melted into its molten form. The molten form of the filament 290 is guided through the channel 26 in the nozzle 18 and deposited from the nozzle 18 in a continuous stream. Accordingly, the nozzle 18 deposits the material onto the platform 22 layer-by-layer to build 3D objects from a bottom surface to a top surface.

Figure 5:
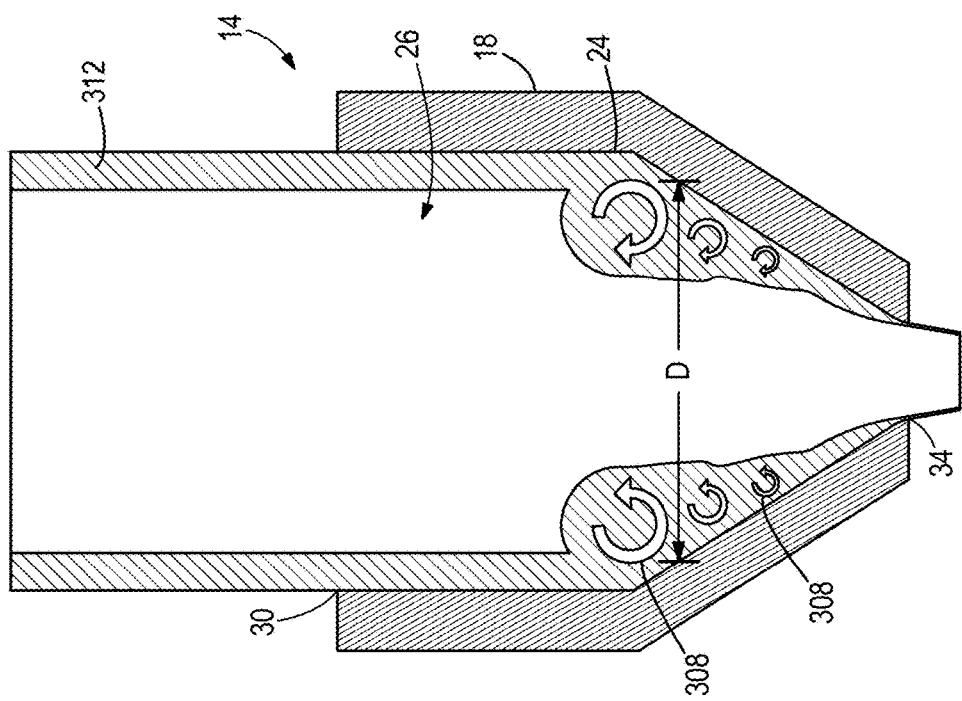

With respect to FIG. 5, typically when a filament 312 is pushed through the nozzle 18, the friction between the walls 24 of the nozzle 18 and the exterior surface of the filament 312 cause the outer portions of the filament 312 to move slower than the remainder of the advancing filament 312. The wall friction creates a velocity profile that can be seen in FIG. 5. As illustrated, the material at the center of the nozzle 18 can be seen moving much faster than the material at the edges. This causes some of the material from the outermost edges of the filament 312 to be left behind and mixed into the filament later on in the printing process.

Figure 6:
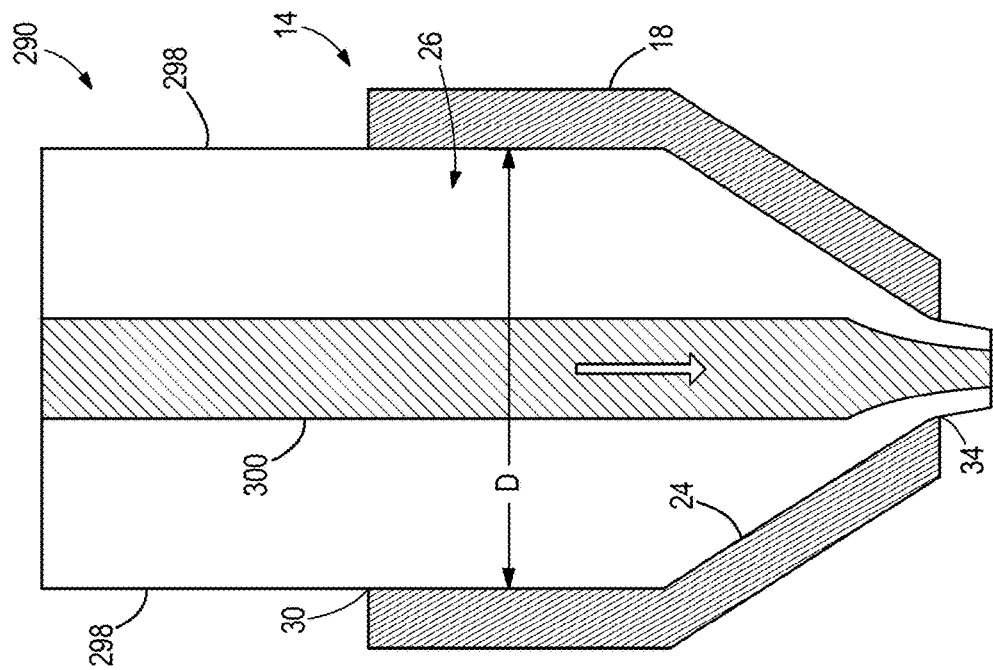
FIGS. 5 and 6 illustrate a schematic diagram of fluid flow through a nozzle of a 3D printer head.

Additionally, when the extrusion nozzle 18 decreases in diameter, stagnant flow or eddies 308 (FIG. 5) occur. Eddies commonly form around sharp transitions in the flow within the nozzle 18. Eddies 308 cause the material to slowly circulate. As this material slowly circulates, it pulls additional material from the outer edges of the new material flowing past the eddies 308, and pushes old material back into the material currently flowing by. FIGS. 5 and 6 illustrate the effect of introducing the color to the exterior surface of a filament. As illustrated in FIG. 6, when color is applied an interior surface of the filament (in accordance with the present invention), the color is prevented from sticking to the walls 24 of the nozzle 18 and getting caught in eddies 308 during nozzle diameter changes.

Figure 21:
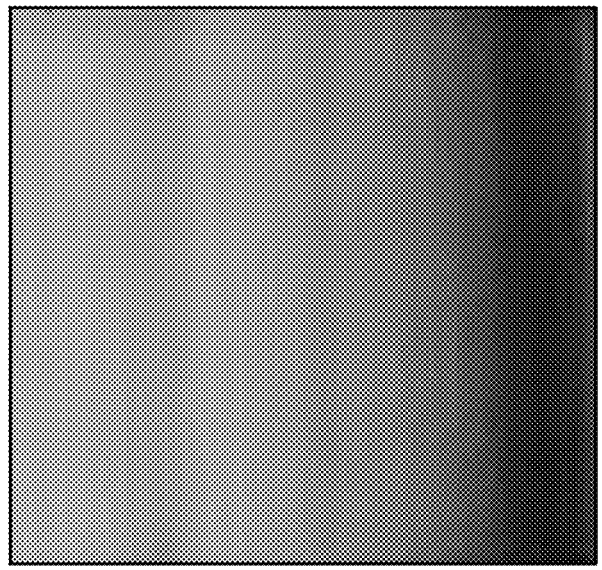
FIG. 21 illustrates a 3D object produced using conventional coloring techniques.

In accordance with preferred embodiments discussed herein, color is applied to the interior surface 300 of the filament 290. However, in other embodiments color can be applied to the surfaces 204 of elements 188 and 192, or to all of the inner surfaces 204 and 300 of the filament 290. Having color only on the inner portions or surfaces of the filament 290 overcomes the problem of cleanly transitioning from one color to another. In other words, while color can also or alternatively be added directly to an exterior surface of the filament 312 or other build material in the above-described continuous process, if the color is applied to the exterior surface or the filament 290 transitioning from one color to another requires an extended period of time to flush the previous color material out of the nozzle because colored material will be left behind as a result of the wall friction, as described above. Additionally, eddies 308 can be responsible for producing old colors once a new color has already been fully realized if color is on an exterior surface of the filament. A 3D object that has been colored using a filament that has color on an exterior surface is illustrated in FIG. 21.

Figure 22:
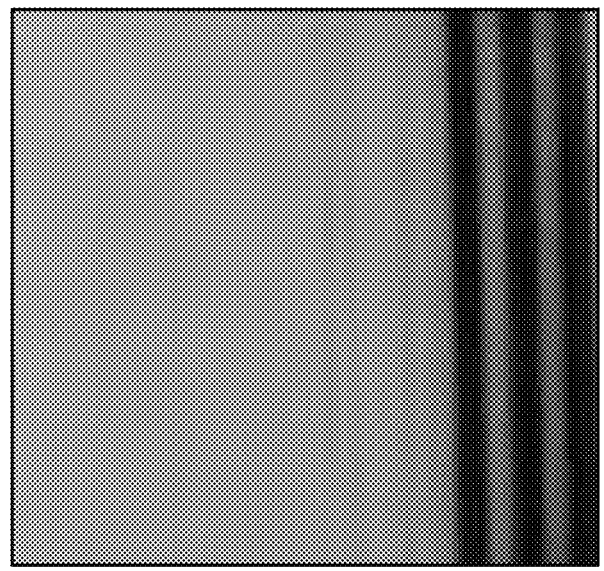
FIG. 22 illustrates a 3D object produced using the assemblies of FIGS. 1-3.

In contrast, adding color to the interior surfaces 300 of the filament 290 substantially eliminates the issues caused by both wall friction and eddies 308 and, therefore, streamlines switching among different colors. This is because the first, colored filament portion 144 (e.g., the interior surface 300 of the filament 290) is surrounded by the second and third filament portions 188, 192 (e.g., the exterior surface 298), which are substantially clear or transparent. Accordingly, the material left behind is also substantially clear or transparent and does not affect subsequent colors being run through the nozzle 18. In other words, color is inhibited from sticking to the walls 24 of the nozzle 18 and getting caught in eddies 308 during diameter changes of the nozzle 18. A 3D object that has been colored using the filament 290 described above, that is with color on the interior surface 290, is illustrated in FIG. 22. The comparison between FIGS. 21 and 22 illustrates how colors can change more quickly or sharply (e.g., within fewer layers) and how the color is less blurred in the 3D object of FIG. 22. For example, the transition distance between colors applied to the center of the filament is 0-5 cm, whereas the transition distance between colors when coloring the exterior of the filament ranged from 10-100 cm. This 95% reduction in transition distance allows the 3D printer 10 to be used to produce more detail when coloring parts.

The color-application unit 104 may have other configurations other than those illustrated in FIGS. 1-3 for applying color to interior surfaces of the filament 290. For example, in the embodiment of FIGS. 1-3, the color-application unit 104 is configured to hold three color applicators 156 on each side of the body 120. However, in the embodiment illustrated in FIG. 7-9, a color-application unit 104 can accommodate only one color applicator 156 on each side of 120. Therefore, multiple color-application units 104 may be positioned appropriately relative to one another to administer different colors to the first filament portion 144. The illustrated color-application unit 104 of FIGS. 7-9 allow the system be easily scaled to accommodate any desired number of different colors (e.g., two, four, ten, twenty, etc.).

Figure 7:
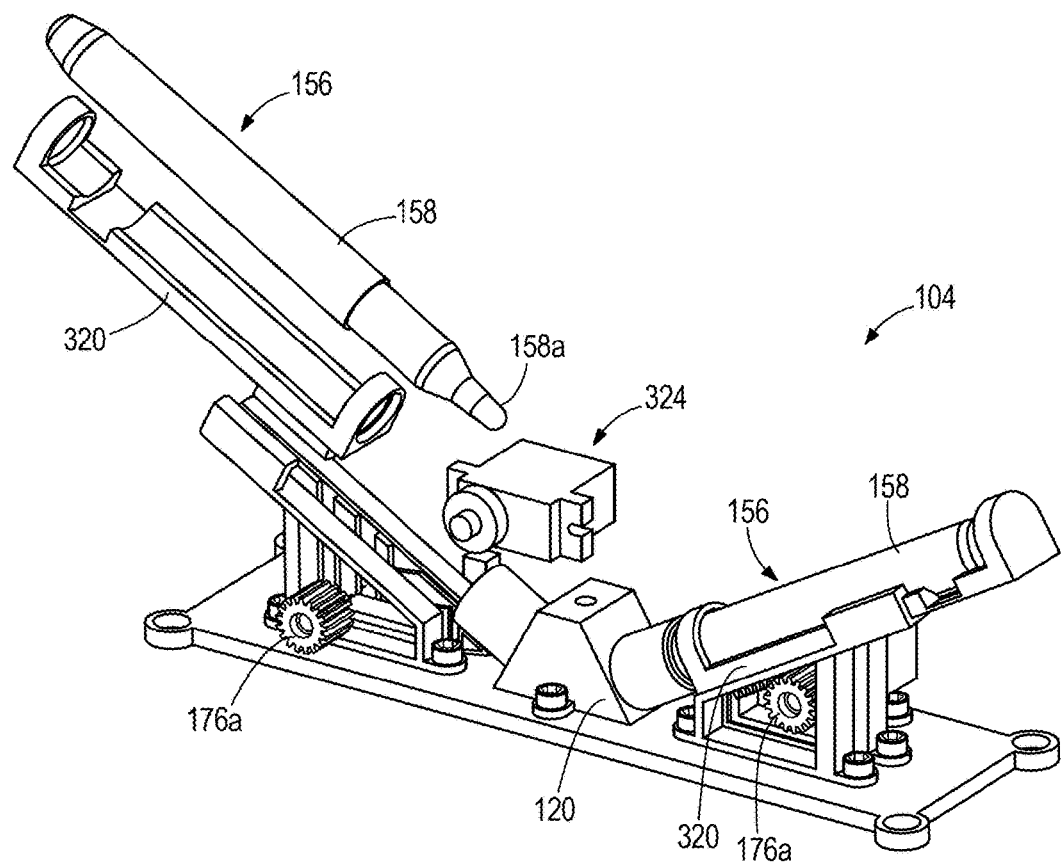
FIG. 7 is an exploded perspective view of another color-application unit for use with a 3D printer.
Figure 8:
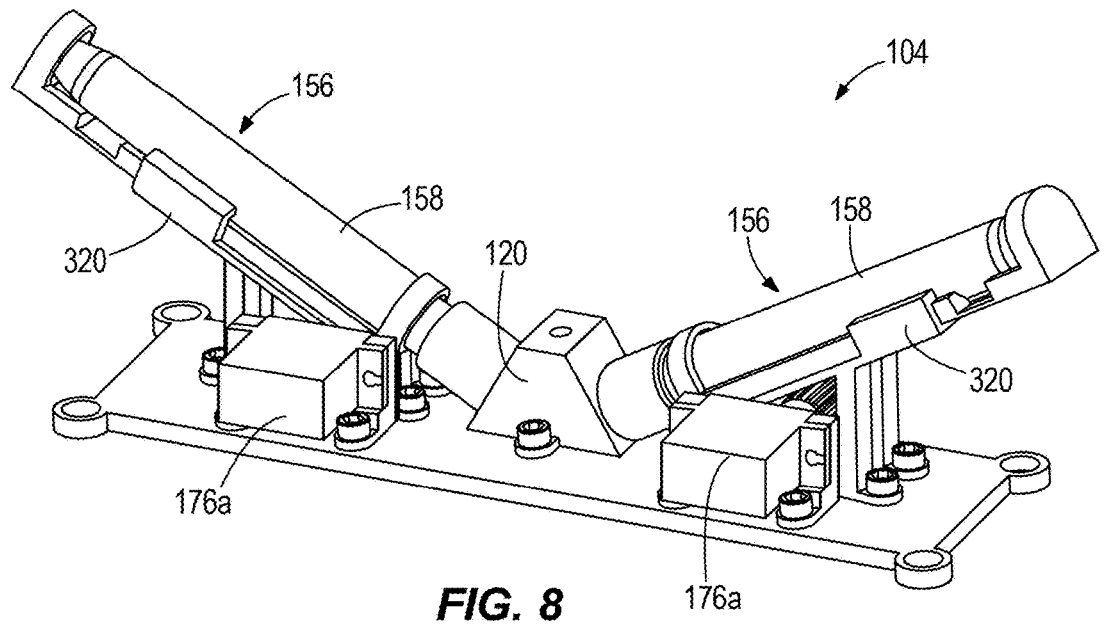
FIG. 8 is a perspective, first side view of the color-application unit of FIG. 7.
Figure 9:
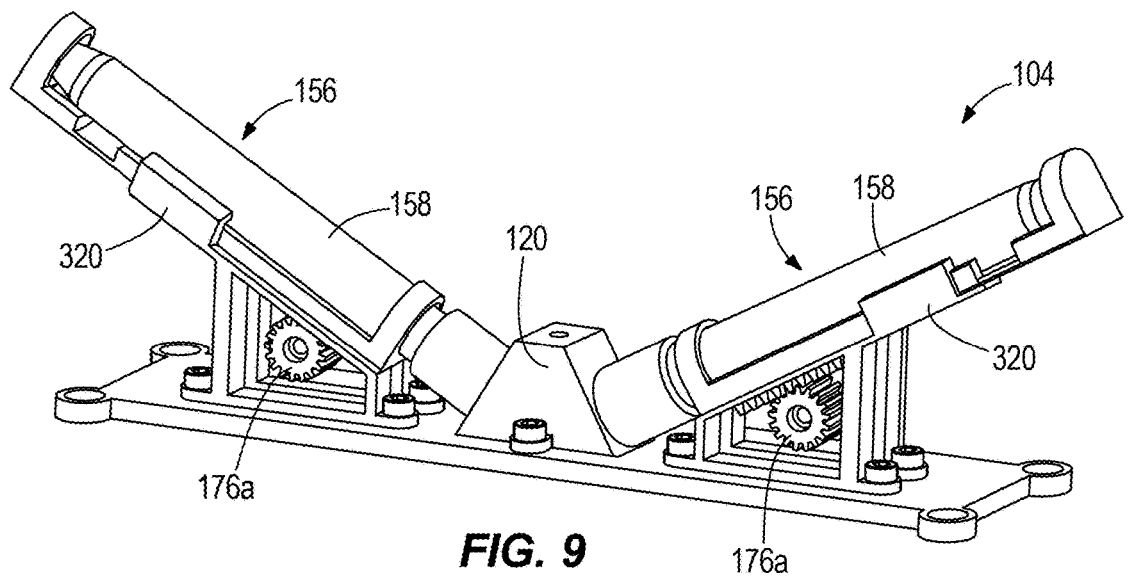
FIG. 9 is a perspective, second side view of the color-application unit of FIG. 7.

Further with respect to FIGS. 7-9, the color-application unit 104 is configured to removably receive color applicators 156 on each side of the body 120. In particular, the color-application unit 104 includes holders or holsters 320 that are each configured to removably receive one of the color applicators 156. Each color applicator 156 is secured into place in the holster 320. Each color applicator 156 is also engaged or disengaged by a motor 176a to control when the color is dispensed onto a portion of the first filament portion 144 to apply the color. The color applicators 156 can be changed out for different color applicators 156 containing different colors, as needed.

Figure 12:
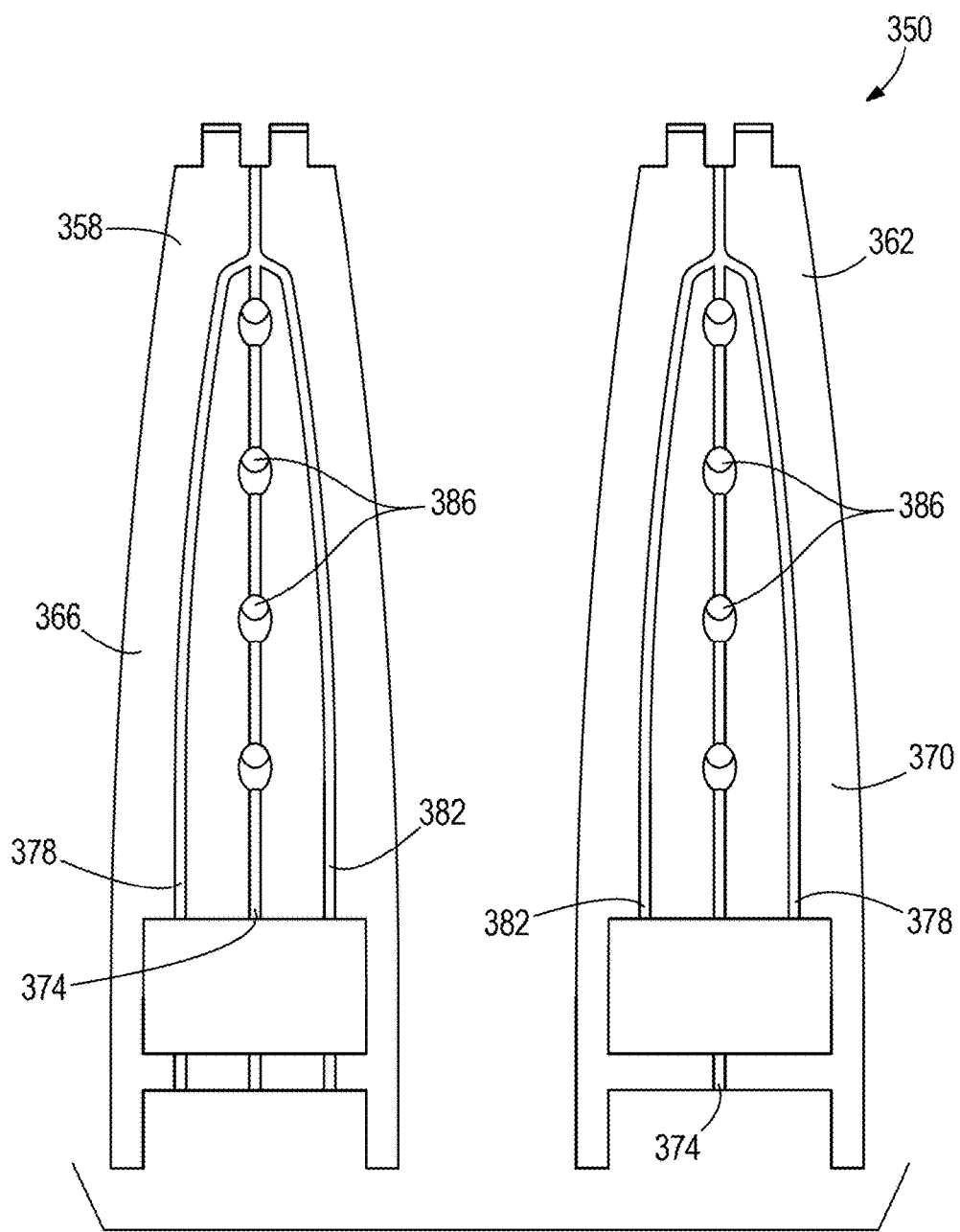
FIG. 12 is an exploded view of the color-application unit of FIG. 10.

While the color-application unit 104 and the coupler 108 are configured as separate structures in the embodiments of FIGS. 10-12, in other embodiments, the color-application unit and the coupler may integrated into a single unit or structure (e.g., color-application unit 350 illustrated in FIGS. 10-12).

As shown in FIGS. 10-12, the color-application unit 350 includes a body 354 having a first member 358 that is coupled to a second member 362. An interior surface 366, 370 of each of the first and the second members 358, 362 defines three grooves 374, 378, 382. The first groove 374 is positioned between the second groove 378 and the third groove 382. Additionally, through-holes or apertures 386 extend from an exterior surface 390, 394 of each of the first member 358 and the second member 362 to the interior surface 366, 370 of each of the first member 258 and the second member 362. Each of the through-holes 386 is configured to slideably receive a color applicator 156. Also, in embodiment illustrated in FIGS. 10-12, the through-holes 286 are oriented at an angle θ relative to the longitudinal axis A. In some embodiments, the angle θ can range from about 20 degrees to about 70 degrees. In the illustrated embodiment, the angle θ is about 45 degrees. In further embodiments, the angle θ may be larger or smaller than that illustrated herein.

When the first member 358 and the second member 362 are coupled together, the first grooves 374 define a first channel or conduit 410, the second grooves 378 define a second channel 414, and the third grooves 382 define a third channel 418. The first, second, and third channels 410, 414, 418 extend from a first end 422 of the body 354 to a second end 426 of the body 354. At the first end 422 of the body 354, the first, second, and third channels 410, 414, 418 are spaced apart from one another. As the channels progress through the body 354, the distance between adjacent channels decrease until the three channels 410, 414, 418 converge into a single discharge channel near the second end 426 of the body 354. A motor assembly (similar to the motor assembly 164 discussed above) can be positioned adjacent to the first end 422 of the body 354 and can include rollers that engages the filament portions 144, 188, 192 to drive the filament portions 144, 188, 192 through the body 354.

In operation, the first, second, and third filament portions 144, 188, 192 are pulled by the motor assembly from their respective spools 148, 180, 184. The first, second, and third filament portions 144, 188, 192 move through the first, second, and third channels 410, 414, 418, respectively, in the body 354 of the color-application unit 104. As the first filament portion 144 moves through the body 354, the color applicators 156 are selectively actuated to apply color to the first filament portion 144, as discussed above with respect to FIGS. 1-3. Near the second end 422 of the body 354, the filament portions 144, 188, 192 converge (as discussed above with respect to the embodiment of FIGS. 1-3) to create the filament 290, which is guided to the 3D printer 10. In particular, in the embodiment of FIGS. 10-12, the second and third channels 414, 418 guide the second and third filament portions 188, 192 to each gradually make a 90 degree turn so that the filament portions 188, 192 wrap around the first filament portion 144 as they exit the body 354.

In the embodiments of FIGS. 1-3 and 7-10, the color applicators 156 are elongate members 158 (e.g., markers) that contain and dispense color, as discussed above. In other embodiments (FIGS. 13 and 14), however, the color applicators 156 of the color-application unit may be inkjet cartridges 450. In some embodiments, the cartridges 450 are piezoelectric inkjet cartridges that are actuated via a processor to selectively apply color to the first filament portion 144.

The piezoelectric inkjet cartridge 450 includes a printhead 454 that uses a pulse generator to provide an electric signal. The signal is applied across piezoelectric crystal plates, one of which contracts and the other of which expands, thereby causing the plate assembly to deflect toward a pressure chamber. This causes a decrease in volume, which imparts sufficient kinetic energy to the liquid dye in the printhead nozzle 458 so that an ink droplet of the liquid dye is ejected from an opening in the printhead 454. Examples of suitable piezoelectric-activated inkjet cartridges 450 may be found in U.S. Pat. No. 4,549,191; U.S. Pat. No. 4,584,590; U.S. Pat. No. 4,887,100; U.S. Pat. No. 5,016,028; U.S. Pat. No. 5,065,170; and U.S. Pat. No. 5,402,162.

The liquid dyes may be contained within a plurality of feed containers equipped with metering devices (not shown) to control the rate and amount of dye or other compositions applied to the filament 10.

Figure 13:
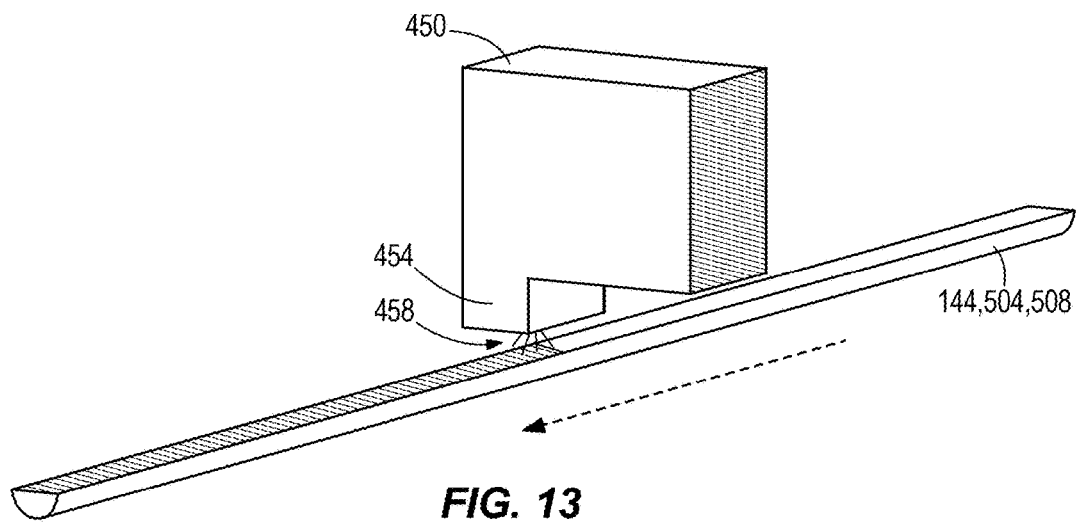
FIGS. 13 and 14 illustrate another color-application unit for use with a 3D printer.
Figure 14:
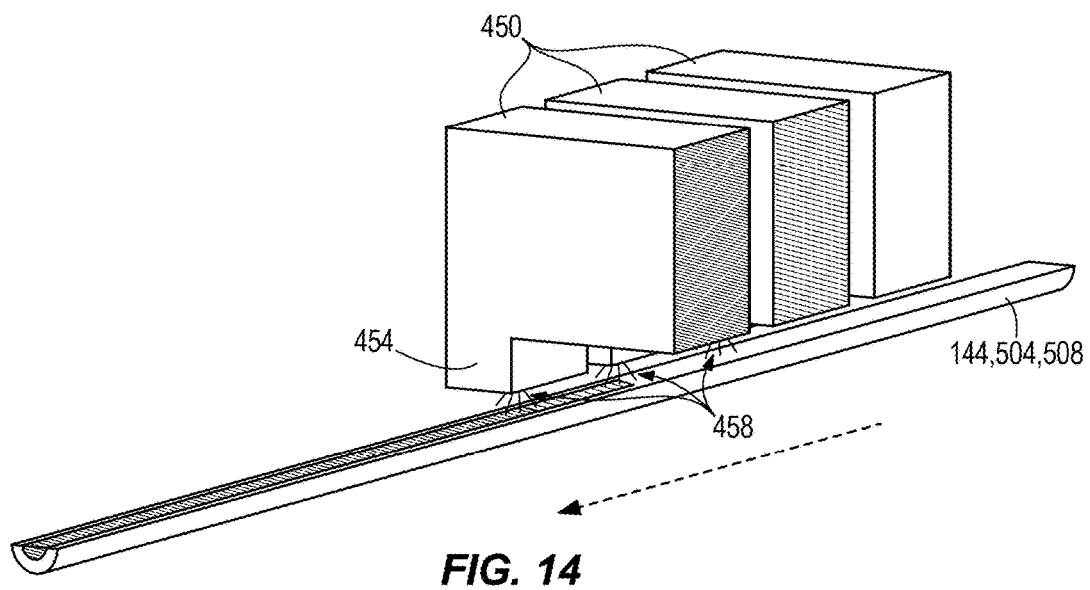

FIG. 13 illustrates the use of one piezoelectric inkjet cartridge 450 to apply color in the form of a liquid dye. FIG. 14 illustrates the use of multiple inkjet cartridges 450 to apply multiple colors to achieve a greater breadth of color options for the final 3D object.

In additional or alternative embodiments, the color applicator 156 may be a thermal inkjet, pressure inkjet, a piezo pump, a pressure pump, a spray mechanism (e.g., using air or pressure), a microfluidic device (e.g., a syringe system), or a stamping or rubber applicator.

In some embodiments, a "fixing region" may be included downstream from the color-application unit 104 where the color is completely or partially fixed to the filament portion 144. For the purposes of the present technology, "fixing" refers to ensuring incorporation of the color on the surface of at least a portion of a filament prior to the coupler. This fixing may be due to polymerization, binding, drying, hardening, crosslinking, addition reaction, or any other process that ensures the color remains incorporated on the filament portion 144 during and after the printing process. For example, in some embodiments the fixing region may be a thermal drying unit (not shown) and/or may include a gas, air jet, or fan (not shown) to assist in drying or otherwise fixing the color to the filament portion 144. Still in other embodiments, the color on the filament portion 144 may be air-dried over a period of time prior to entering the coupler.

Figure 17:
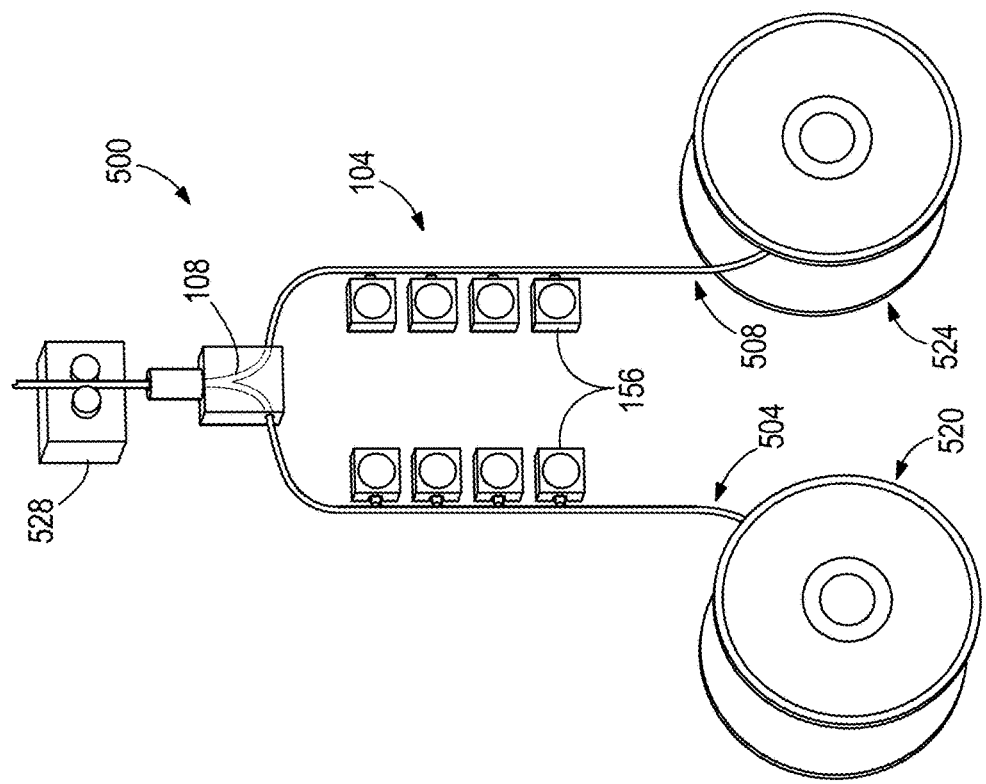
FIG. 17 is a schematic of another assembly for use with a 3D printer.
Figure 16:
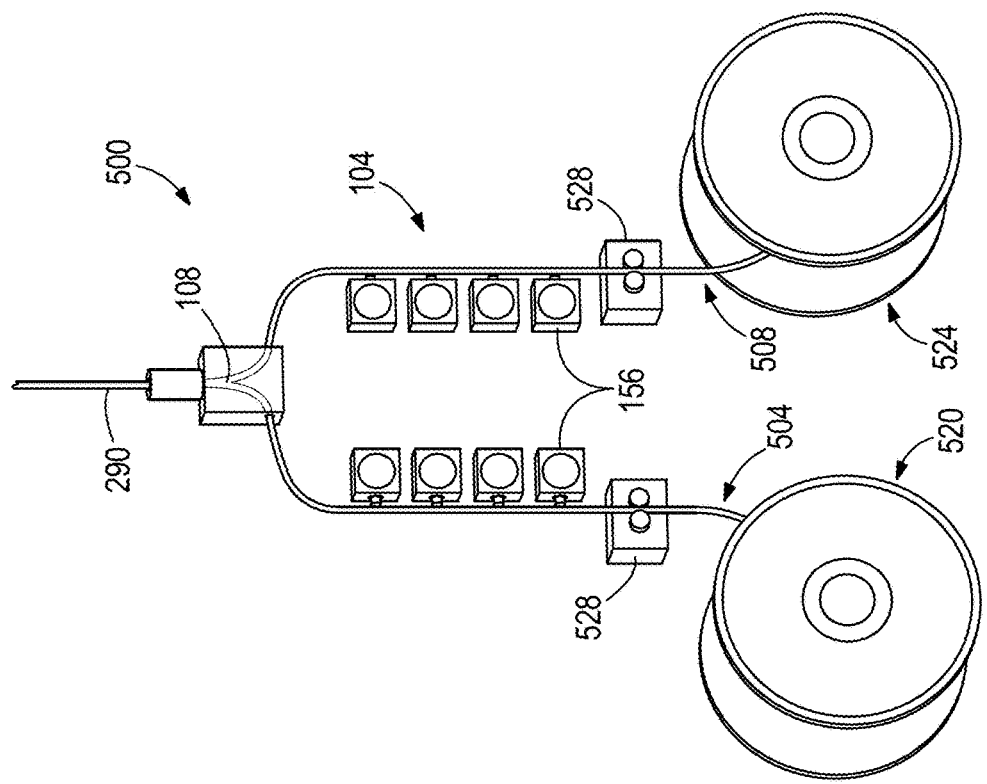
FIG. 16 is a schematic of the assembly of FIG. 15.
Figure 18:
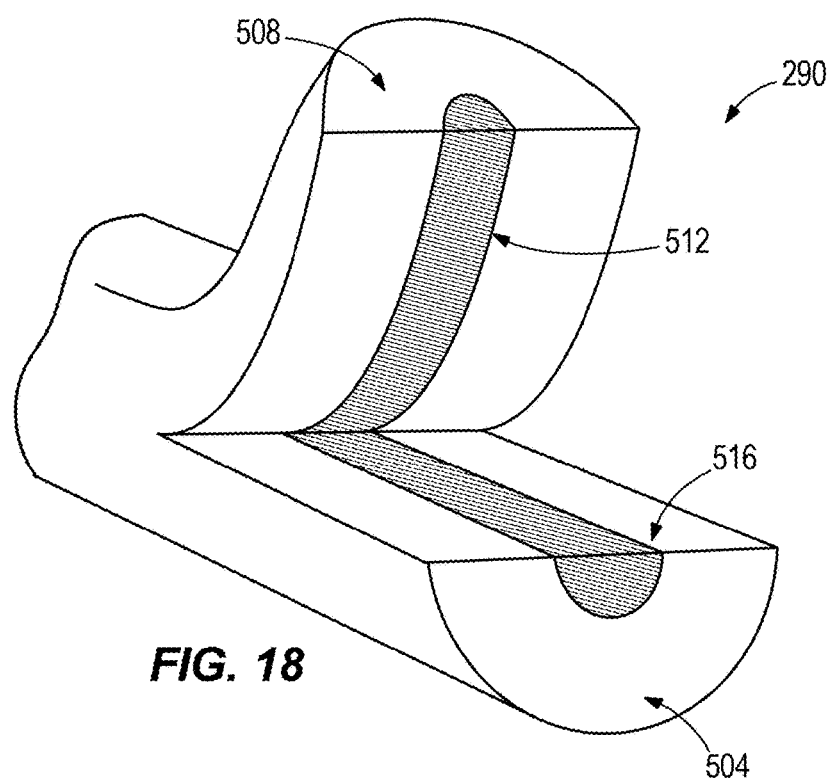
FIGS. 18-20 illustrate filaments created by the assemblies of FIGS. 1-4 and 7-17.
Figure 19B:
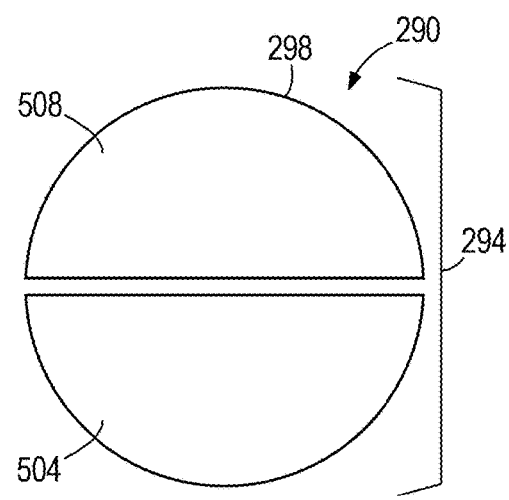

The embodiments illustrated in FIGS. 1-3 and 10-12 illustrate color-application and feed assemblies in which three filament portions 144, 188, 192 are combined or coupled to create the filament 290 that is fed to the 3D printer. It should be understood, however, that the filament 290 may be constructed from fewer or more filament portions. For example, FIGS. 15-17 illustrate color-application and feed assemblies 500 in which two filament portions 504, 508 are combined or coupled to create the filament 290 that is fed to the 3D printer. As illustrated in FIGS. 18 and 19, first and second filament portions 504, 508 include a half-cylinder filament profile 294. The half-cylinder filament portions 504, 508 may be constructed from splitting formerly cylindrical filament or may be manufactured as such. Accordingly, color is applied to an interior surface 512, 516 of each of the first and the second filament portions 504, 508. In some embodiments, the two filament portions 504, 508 may be split to expose the interior surfaces 512, 516 and apply color, yet still remain connected together.

As shown in FIGS. 15-17, the color is applied to the interior surfaces 512, 516 of the filament portions 504, 508 via the color applicators 156 before the first and the second filament portions 504, 508 are coupled together to create the filament 290. This allows the on-demand or continuous incorporation of color to the interior surfaces 300 of the filament 290, as opposed to coating the exterior surface 298 of the filament 290, allowing for enhanced multi-coloring of 3D objects.

Figure 4:
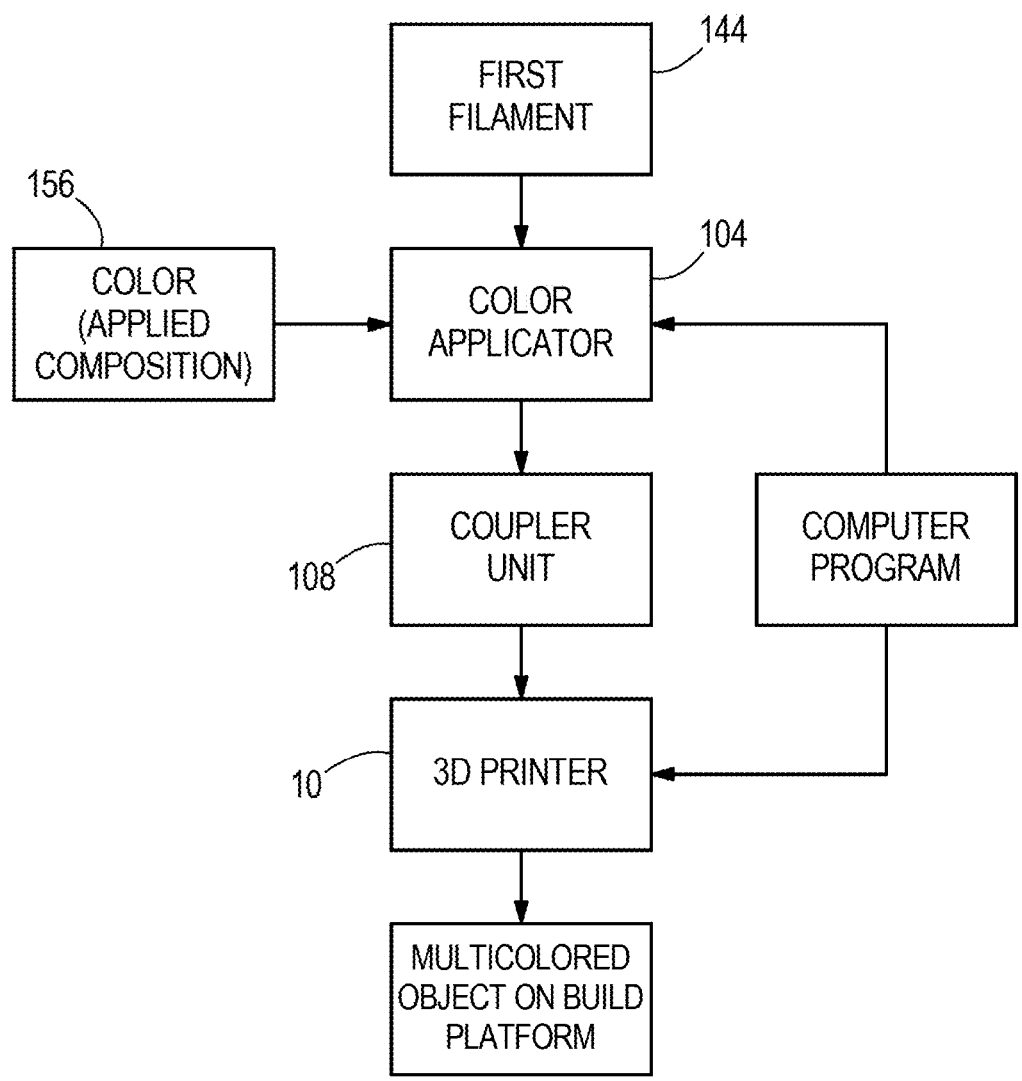
FIG. 4 is a schematic view the systems of FIGS. 1-3.

The schematic diagram of FIG. 4, discussed above, also applies to the operation of the color-application and feed assembly 500 of FIGS. 15-17 and the 3D printer 10. With respect to FIG. 15, each filament portion 504, 508 is introduced to the color applicator 104. In particular, each of the filament portions 504, 508 are pulled from their respective spools 520, 524 through the color-application unit 104 by motorized rollers 528, one for each filament portion 504, 508, respectfully. In other embodiments, the motorized rollers 528 may be alternatively controlled by a single motor, which may be the same motor that also controls a feeder in the 3D printer 10. The motorized rollers 528 pull each filament portion 504, 508 through the color-application unit 104 and into the coupler 108 at the same rate. Alternatively, each motorized roller 528 may be controlled by separate motors working at the same rate. Accordingly, one or more colors are applied to the interior surfaces 512, 516 of the filament portions 504, 508, as directed by the user. After applying the color to the surface 512, 516 of the filament portions 504, 508, the two filament portions 504, 508 are joined together in the coupler 108 to create the filament 290. The colored surfaces 512, 516 of the filament portions 504, 508 make up interior surfaces 300 of the filament 290. Once coupled, the filament 290 is introduced to the 3D printer 10, where the filament 290 is heated and extruded from the extruder nozzle 18 layer by layer onto a build platform 22, as discussed above. This results in a multicolored 3D object.

FIGS. 16 and 17 illustrate alternative placements of the motorized rollers 528 that could be used to control and guide the filament portions 504, 508 to the 3D printer. FIG. 16 includes the set of motorized rollers 528 upstream of the color-application unit 104. FIG. 17 illustrates the use of a single motorized roller 528 downstream from the coupler 108 and upstream of the printer head 14.

It may be preferable to use any combination of these or other motorized roller 528 placements to convey the filament portions 504, 508 to the 3D printer 10. It may also be preferable to include additional braking rolls and a guiding system (not pictured) to provide consistent tension in each filament portion 504, 508 as they are pulled through the color-application unit 104 and introduced into the coupler 108.

Figure 20:
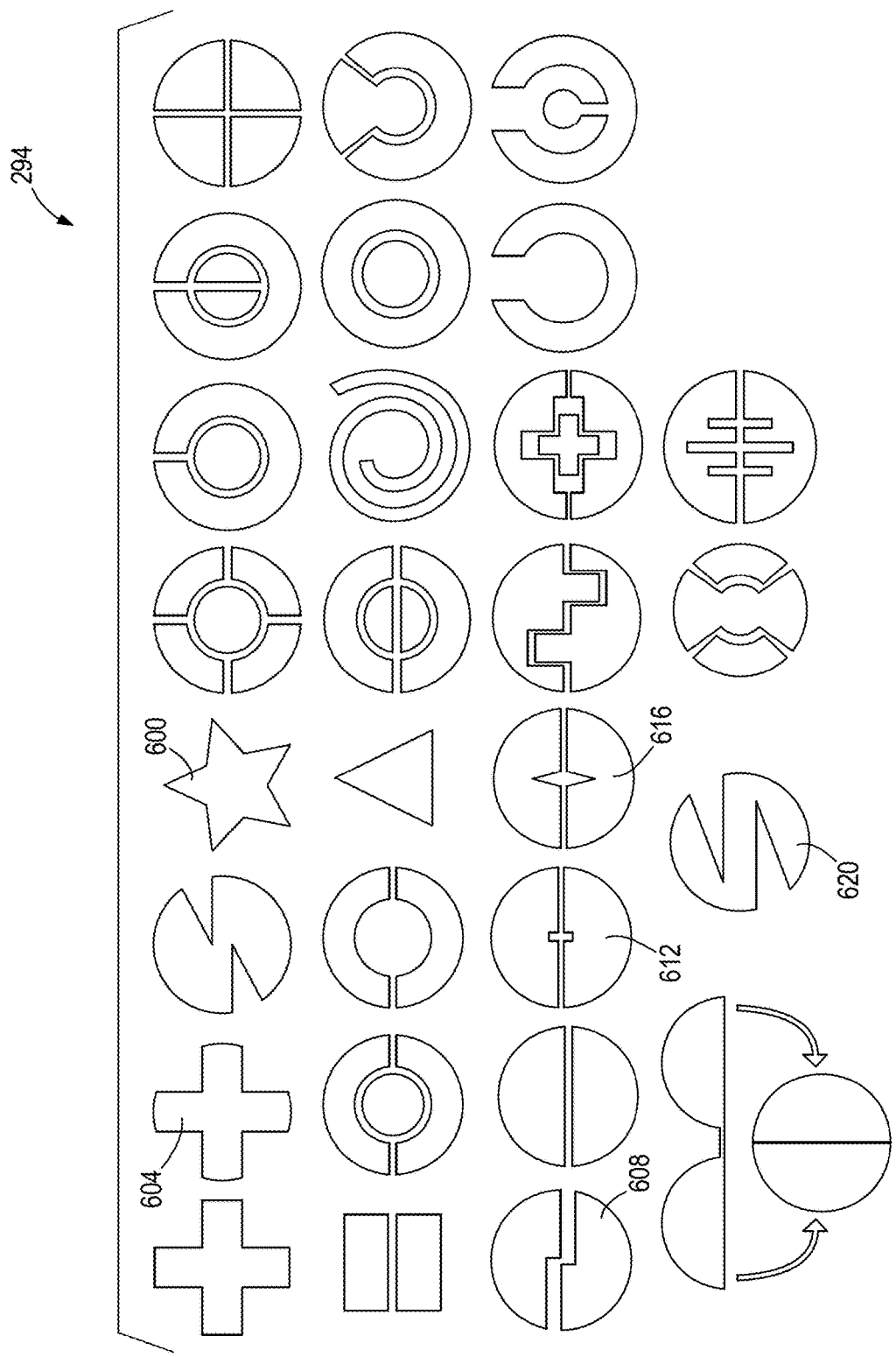

In additional or alternative embodiments, a single filament or greater than three filament portions may be used. FIG. 20 illustrates several examples of potential filament profiles (e.g., cross-sections) that could be used to apply color to an interior surface of a filament. The examples illustrated in FIG. 20 are not intended to be an exclusive list. For example, FIG. 20 illustrates several examples of additional filament profile shapes, including single, whole filament strands, third strands, and quarter strands that may be used to improve coupling and/or color application and subsequent saturation and is not intended as an exhaustive list. Therefore, filaments 290 comprising between one and six coupled filament portions may be colored by one of the color-application units described herein and introduced into a coupler for use with a 3D printer 10.

While the exemplary filament profiles 294 are by no means exhaustive, the filament profiles may be configured as a "star" shape 600 or "cross" shape 604. Further the filament profiles may be a "step shaped" profile 608, a "notch shaped" profile 612, "diamond-notch shaped" profile 616, "Z-shaped" profile 620 or other variations either included in FIG. 20 or otherwise. Other example of filament profiles may include a "tooth-and-comb" shape or a "notch-and-lock" shape.

To achieve these profiles, a number of manufacturing processes can be implemented. The most common practice is the use of an extruder die that can be machined to the desired profile of the filament. The plastic can be extruded through the die to create the desired filament profile. In addition, a series of rollers and/or colanders can also be used with an extrusion system to shape the extruded plastic into the desired filament profile. These are two examples, not an extensive list, of the possible processes.

The filament portions 144, 188, 192, 504, 508 described herein may be constructed of any material that is compatible with 3D printers. In particular, the filaments and filament portions thereof may be constructed from poly lactic acid (PLA) and acrylonitrile-butadiene-styrene (ABS) thermoplastic, which is commonly used with 3D printers that are currently available. In other embodiments, the ABS filament is made out of oil based resources, has a much higher melting point than PLA plastic, and is stronger and harder. In other embodiments, the PLA filament is a biodegradable type of plastic that is manufactured out of plant-based resources, such as cornstarch or sugar cane. Other materials may include, but are not limited to polyvinyl acetate (PVA), nylon, thermoplastic elastomer (TPE), polycarbonate (PC), polyethylene terephthalate (PET), high impact polystyrene (HIPS), flexible material, stone filament, wood filament, or a conductive ABS filament. Additionally, bronze fill, wood fill, and conductive fill are within the scope of materials from which the materials may be constructed. In other embodiments, both types of thermoplastics or any other suitable polymer build material could be used to print multi-colored 3D objects depending on the needs of the user and the intentions of the final 3D object. Furthermore, material development is an ever-evolving aspect of 3D printing, and, therefore, the filament may be constructed from materials that are not yet known. Additionally, additives may be added to the filaments. Additives include, but are not limited to, color, conductive materials, magnetic materials, antimicrobial materials, metals, adhesives, and flavoring.

The color described herein may be solvent dyes, inks, pigments, and/or any other suitable chemical compositions or additives, such as aromatics, anti-microbial substances, flavorings, conductive materials, magnetic materials, glitters, fluorescent materials, and living cells. In preferred embodiments, the color-application unit 104 will use a solvent dye as the applied composition for adding color to the filament portions 144, 504, 508. The dyes may be composed of xylene, ethyl acetate, ethyl lactate, ethanol, butanol, and acetone, or any combination thereof. Alternatively, other organic dyes, pigments, and/or inks could be used to integrate color into the filament portions 144, 504, 508. These listed compositions are intended as examples of possible applied compositions and are not intended to be exclusive.

A composition the solvent of the color is determined by solubility parameters of solvents and materials used for the filaments and filament portions thereof. An effective solvent will have a solubility parameter of about 2 $(cal/cm^3)^{0.5}$ within the plastic material to be solubilized or penetrated. For example, PLA has a solubility parameter of 10.3 $(cal/cm^3)^{0.5}$ and xylene, ethyl lactate and ethyl acetate have solubility parameters of 8.8 $(cal/cm^3)^{0.5}$, 10.41 $(cal/cm^3)^{0.5}$, and 9.1 $(cal/cm^3)^{0.5}$, respectively.

Referring back to FIG. 1, each of the color-application and feed assemblies 100, 500 illustrated and described herein also includes a controller 700, a power supply module 704, a user interface 708, a communication module 712, and a motor module 716.

The controller or processor 700 is part of, or is connected to, an external device (e.g., a computer). The controller 700 (or computer) includes combinations of software and hardware that are operable to, among other functions, control the operation of color-application and feed assembly 100, 500, control the speed at which the filament portions 144, 188, 192, 504, 508 are pulled from the spools 148, 180, 184, 520, 524, and control the color that is applied to the filament portions 144, 504, 508. In one implementation, the controller 700 or external device includes a printed circuit board ("PCB") that is populated with a plurality of electrical and electronic components that provide, power, operational control, and protection to the power distribution devices. In some implementations, the PCB includes, for example, a processing unit (e.g., a microprocessor, a microcontroller, or another suitable programmable device), a memory, and a bus. The bus connects various components of the PCB including the memory to the processing unit. The memory includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit is connected to the memory and executes software that is capable of being stored in the RAM (e.g., during execution), the ROM (e.g., on a generally permanent basis), or another non-transitory computer readable medium such as another memory or a disc. Additionally or alternatively, the memory is included in the processing unit. The controller also includes an input/output ("I/O") unit that includes routines for transferring information between components within the controller and other components of the color-application assembly or the 3D printer. For example, the communication module is configured to provide communication between the color-application and feed assembly and one or more devices in the 3D printer.

Software included in some implementations of the power distribution device is stored in the memory of the controller 700. The software includes, for example, firmware, one or more applications, program data, one or more program modules, and other executable instructions. The controller 700 is configured to retrieve from memory and execute, among other components, instructions related to the control processes and methods described above. For example, the controller 700 is configured to execute instructions retrieved from the memory for determining which color to apply to the filament portions 144, 504, 508 based on data received in data packets from an external source or from the memory. In some implementations, the controller 700 or external device includes additional, fewer, or different components. In some embodiments, a computer program may be utilized to assist in the performance of the present technology. For example, using a computer program in conjunction with the 3D printer 10, the user imports a model of the desired 3D object into the program. The user then indicates the desired color or colors on the computer model. The computer program then slices the colored model layer by layer, creating directions for which color or colors to apply and when, and sends those directions to the color-application unit 104.

The PCB also includes, among other components, a plurality of additional passive and active components such as resistors, capacitors, inductors, integrated circuits, and amplifiers. These components are arranged and connected to provide a plurality of electrical functions to the PCB including, among other things, filtering, signal conditioning, or voltage regulation. For descriptive purposes, the PCB and the electrical components populated on the PCB are collectively referred to as the controller 700.

The power supply module 704 supplies a nominal AC or DC voltage to the color-application and feed assembly 100, 500. The power supply module 704 is powered by main power having nominal line voltages between, for example, 100V and 240V AC and frequencies of approximately 50-60 Hz. The power supply module 704 is also configured to supply lower voltages to operate circuits and components within the color-application and feed assembly 100, 500. In some implementations, the power distribution device is powered by one or more batteries or battery packs.

The user interface 708 is included to control the color-application and feed assembly 100, 500 or the operation of the 3D printer 10 as a whole. The user interface is operably coupled to the controller to control, for example, the color applied to the filament portions 144, 504, 508. The user interface 708 can include any combination of digital and analog input devices required to achieve a desired level of control for the system. For example, the user interface 708 can include a computer having a display and input devices, a touch-screen display, a plurality of knobs, dials, switches, buttons, faders, or the like. In some implementations, the user interface is separated from the color-application and feed assembly 100, 500.

The communication module 712 sends and/or receives signals to and/or from one or more separate communication modules. Signals include, among other components, information, data, serial data, and data packets. The communication module 712 can be coupled to one or more separate communication modules via wires, fiber, and/or a wirelessly. Communication via wires and/or fiber can be any appropriate network topology known to those skilled in the art, such as Ethernet. Wireless communication can be any appropriate wireless network topology known to those skilled in the art, such as Wi-Fi.

The motor module 716 includes, among other components, one or more motor devices. The one or more motor devices 164, 268, 528 are configured to receive signals from the controller 700 and pull the filament portions 144, 188, 192, 504, 508 through the color-application assembly. In some implementations, the one or more motor devices are stepper motors.

The illustrated controller 700 is also coupled to the motor assemblies 176 of the color applicators 156. In some implementations, the controller 700 transmits signals to the motor assemblies 176, which cause the assemblies 176 to move the color applicators 156. For example, based on a desired color for a particular layer or portion of a 3D printed object, the controller 700 can actuate the motor assemblies 176 at suitable times to color the filament 290 so that portions of the filament 290 being used to form the particular layer or portion are the proper color. Since the controller 700, color-application unit 100, and 3D printer 10 function as a single system, the controller 700 knows how far the colored filament 290 will travel before the filament 290 will actually be used by the printer 10. The controller 700 accounts for this lag time to appropriately color the filament 290. Furthermore, the controller 700 can continuously actuate and de-actuate the motor assemblies 176 to apply different colors to different sections of the filament 290. For example, the controller 700 can actuate the assemblies 176 to color a first section (e.g., 10 cm length) of the filament 290 a first color (e.g., red), color a second section (e.g., a 20 cm length) of the filament 290 a second color (e.g., blue), and color a third section (e.g., a 15 cm length) of the filament 290 a third color (e.g., white). The amount and type of color applied to the filament 290 can be programmed into the controller 700 by a user, or can be automatically determined by the controller 700 based on desired colors identified in, for example, a CAD model.

Although the invention has been described above with reference to certain preferred embodiments of the invention, variations and modifications exist within the spirit and scope of one or more independent aspects of the invention as described. Various features and advantages of the disclosure are set forth in the following claims.

What is claimed is:

1. An assembly that is configured to be coupled to and communicate with a 3D printer having a printer head, the assembly comprising:
   a color-application unit positioned upstream of the 3D printer, the color-application unit configured to receive a filament and direct the filament to the printer head of the 3D printer, the color application unit including:
      a body;
      a conduit extending through the body;
      a motor that engages the filament to move the filament through the conduit; and
      a through-hole that extends through the body and is communication with the conduit; and
   a color applicator coupled to the color-application unit, the color applicator operable to selectively apply color to an interior surface of the filament, the color applicator including an elongate member containing the color and having a color applicator tip that applies color to the filament through the through-hole, wherein at least a portion of the elongate member is slidably received within the through-hole to selectively engage and apply color onto the filament.

2. The assembly of claim 1, wherein the filament includes a first filament portion and a second filament portion, the first filament portion defining the interior surface, and further comprising a coupler positioned downstream of the color applicator and configured to join the first filament portion to the second filament portion to form the filament.

3. The assembly of claim 2, wherein the color-application unit and the coupler are integrated together as a single unit.

4. The assembly of claim 2, wherein the coupler includes a body that has a first channel and a second channel, wherein the first channel receives the first filament portion and the second channel receives the second filament portion, and wherein the first channel and the second channel converge within the body to form a discharge channel that guides the filament through the body.

5. The assembly of claim 4, wherein the coupler includes a motor and a roller assembly that is actuated by the motor, and wherein the roller assembly engages the first filament portion and the second filament portion to advance the filament through the body.

6. The assembly of claim 4, wherein the body of the coupler also has a third channel that receives a third filament portion, wherein the third channel converges with the first channel and the second channel to form the discharge channel, and wherein the coupler joins the second and third filament portions to substantially enclose the first filament portion.

7. The assembly of claim 1, further comprising a second color applicator coupled to the color-application unit, the second color applicator operable to selectively apply a different color to the interior surface of the filament.

8. The assembly of claim 1, wherein the color applicator includes one or more of an inkjet cartridge, a thermal inkjet, a pressure inkjet, a piezo pump, a pressure pump, a spray mechanism, a microfluidic device, and a rubber applicator.

9. A method for preparing a filament for use with a printer head of a 3D printer, the method comprising:
   receiving the filament at a color-application unit positioned upstream of the 3D printer, wherein the filament includes a first filament portion defining an interior surface of the filament, a second filament portion, and a third filament portion;
   applying color, by a color applicator coupled to the color-application unit, to the interior surface of the filament;
   coupling the second filament portion to the third filament portion to substantially enclose the first filament portion between the second and third filament portions to form the filament; and
   directing the filament from the color-application unit to the printer head of the 3D printer.

10. The method of claim 9, wherein coupling the first filament portion to the second filament portion includes joining, by a coupler positioned downstream of the color applicator, the first filament portion and the second filament portion together.

11. The method of claim 10, wherein the coupler includes a body having a first channel and a second channel that converge within the body to form a discharge channel, further comprising:
   receiving the first filament portion in the first channel;
   receiving the second filament portion in the second channel; and
   joining the first filament portion and the second filament portion together within the discharge channel.

12. The method of claim 11, wherein directing the filament to the printer head includes dispensing the filament from the discharge channel of the coupler and guiding the filament to the printer head.

13. The method of claim 9, wherein the color applicator includes one of an elongate member having a color applicator tip or an inkjet cartridge, if the color applicator is the elongate member, applying color to the interior surface of the filament includes moving the color applicator tip into contact with the interior surface, if the color applicator is the inkjet cartridge, applying color to the interior surface of the filament includes actuating the inkjet cartridge to dispense color.

14. The method of claim 9, wherein applying color to the interior surface of the filament includes applying a first color to a first section of the interior surface and applying a second color to a second section of the interior surface, the first color being different than the second color.

15. The method of claim 9, wherein the color applicator includes one or more of an inkjet cartridge, a thermal inkjet, a pressure inkjet, a piezo pump, a pressure pump, a spray mechanism, a microfluidic device, and a rubber applicator.

16. An assembly that is configured to be coupled to and communicate with a 3D printer having a printer head, the assembly comprising:
   a color-application unit positioned upstream of the 3D printer, the color-application unit configured to receive a filament and direct the filament to the printer head of the 3D printer, wherein the filament includes a first filament portion defining an interior surface of the filament, a second filament portion, and a third filament portion;
   a color applicator coupled to the color-application unit, the color applicator operable to selectively apply color to the first filament portion; and
   a coupler positioned downstream of the color applicator and including a body having a first channel, a second channel, and a third channel,
   wherein the first channel, the second channel, and the third channel converge to form a discharge channel that guides the filament through the body,
   wherein the first channel receives the first filament portion, the second channel receives the second filament portion, and the third channel receives the third filament portion, and wherein the coupler joins the second filament portion and the third filament portion to substantially enclose the first filament portion.

17. The assembly of claim 16, wherein the color applicator includes one or more of an inkjet cartridge, a thermal inkjet, a pressure inkjet, a piezo pump, a pressure pump, a spray mechanism, a microfluidic device, and a rubber applicator.

* * * * *